US011260800B2

(12) United States Patent
Grab et al.

(10) Patent No.: US 11,260,800 B2
(45) Date of Patent: Mar. 1, 2022

(54) VEHICLE INTERIOR COMPONENT

(71) Applicant: Shanghai Yanfeng Jinqiao Automotive Trim Systems Co. Ltd., Novi, MI (US)

(72) Inventors: Tyler Tucker Grab, Grand Rapids, MI (US); Adam R. Gofton, West Olive, MI (US); James Lucien Diem, Zeeland, MI (US); Randy Len Arendsen, Zeeland, MI (US)

(73) Assignee: Shanghai Yanfeng Jinqiao Automotive Trim Systems Co. Ltd., Novi, MI (US)

( * ) Notice: Subject to any disclaimer, the term of this patent is extended or adjusted under 35 U.S.C. 154(b) by 0 days.

(21) Appl. No.: 17/097,718

(22) Filed: Nov. 13, 2020

(65) Prior Publication Data
US 2021/0061180 A1 Mar. 4, 2021

Related U.S. Application Data

(63) Continuation of application No. 16/134,431, filed on Sep. 18, 2018, now Pat. No. 10,836,323, which is a (Continued)

(51) Int. Cl.
*B60R 7/08* (2006.01)
*B60R 7/04* (2006.01)
*B60R 11/00* (2006.01)

(52) U.S. Cl.
CPC ............ *B60R 7/082* (2013.01); *B60R 7/04* (2013.01); *B60R 2011/0028* (2013.01); *B60R 2011/0082* (2013.01)

(58) Field of Classification Search
CPC ... B60R 7/082; B60R 7/04; B60R 2011/0028; B60R 2011/0082
(Continued)

(56) References Cited

U.S. PATENT DOCUMENTS 5,197,775 A * 3/1993 Reeber ............... B60R 7/06
296/37.12
5,823,612 A 10/1998 Angelo
(Continued)

FOREIGN PATENT DOCUMENTS

CN 1530258 A 9/2004
JP H0556648 U 7/1993
(Continued)

OTHER PUBLICATIONS

Second Office Action from the State Intellectual Property Office of the People's Republic of China for CN Patent Application No. 201880037615.8 dated Feb. 10, 2021 (with English Translation) (14 Pages).

(Continued)

*Primary Examiner* — Joseph D. Pape

(57) ABSTRACT

A component for a vehicle interior is disclosed. The component may comprise a bin coupled to a base and a seat comprising a tab to retain a shaft in an aperture for rotation of the bin. The tab may contact the shaft along a plane adjacent to the shaft. The tab may retain/apply a force to the shaft at a tangent of the shaft. The tab may contact a protrusion in response to engagement of the shaft and tab. The tab may comprise a set of opposing sides; one side may contact the shaft; the other side may contact the protrusion. The tab may extend from the base in an extended direction; the tab may contact the shaft along a plane aligned with the extended direction; the tab may apply force to the shaft transverse to the extended direction. The tab may rotate when engaged with the shaft.

20 Claims, 7 Drawing Sheets

Related U.S. Application Data continuation of application No. PCT/US2018/036468, filed on Jun. 7, 2018.

(60) Provisional application No. 62/517,491, filed on Jun. 9, 2017.

(58) Field of Classification Search
USPC .............................................. 296/37.8, 37.12
See application file for complete search history.

(56) References Cited

U.S. PATENT DOCUMENTS

| | | |
|---|---|---|
| 2007/0096489 A1 | 5/2007 | Park |
| 2013/0193706 A1* | 8/2013 | Minelli ................... B60R 11/02 |
| | | 296/37.8 |
| 2015/0360616 A1* | 12/2015 | Shami ...................... B60R 7/06 |
| | | 296/37.8 |

FOREIGN PATENT DOCUMENTS

| | | |
|---|---|---|
| JP | 2004345441 A | 12/2004 |
| WO | 2015153436 A1 | 10/2015 |

OTHER PUBLICATIONS

Communication pursuant to Article 94(3) EPC from the European Patent Office for EP Patent Application No. 18812658.5 dated Jul. 7, 2021 (in English) (18 Pages).

* cited by examiner

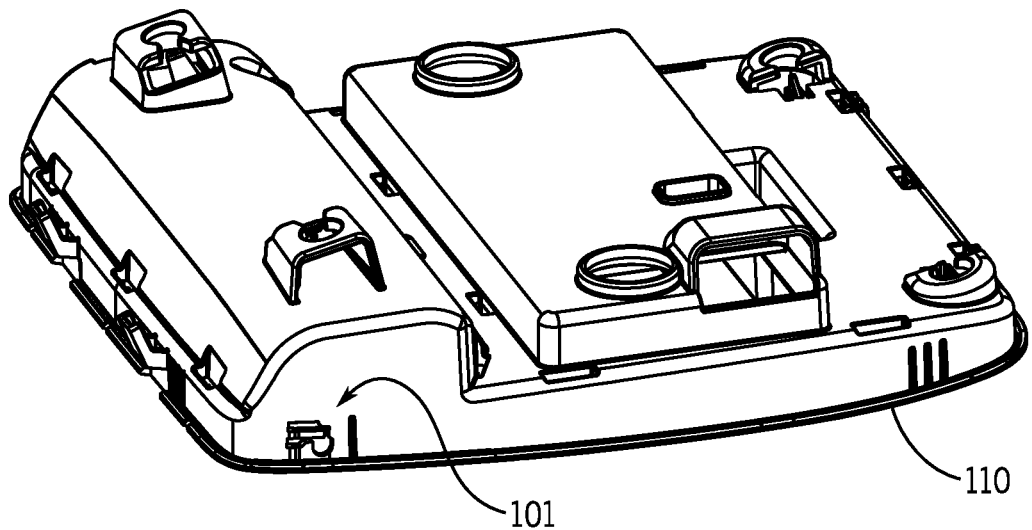
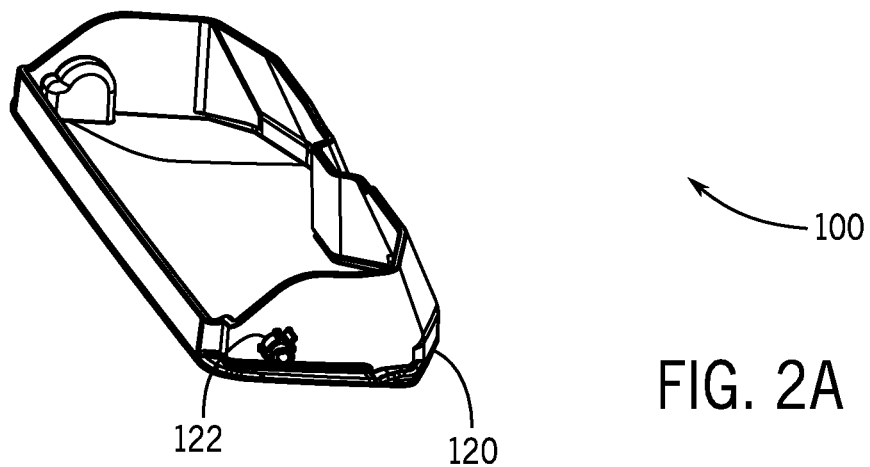
FIG. 2A
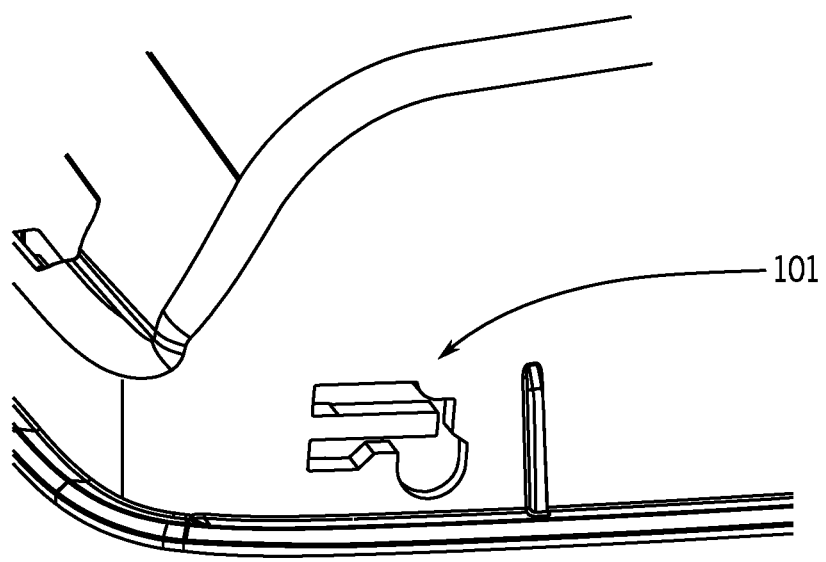
FIG. 2B

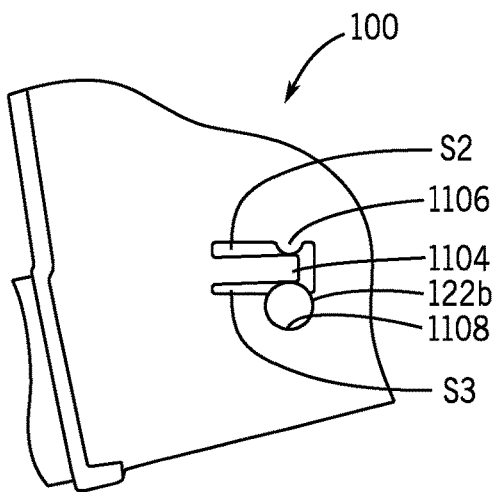
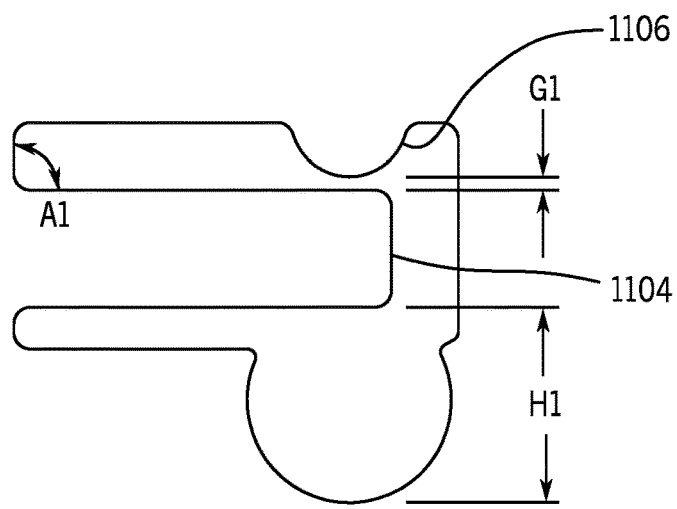
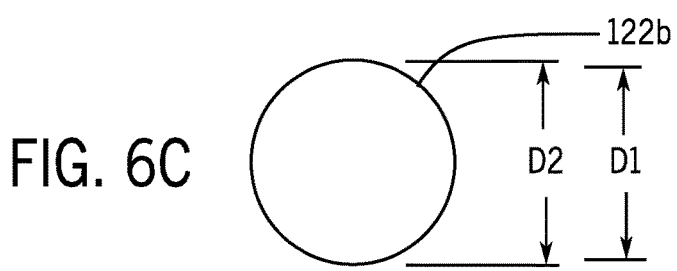
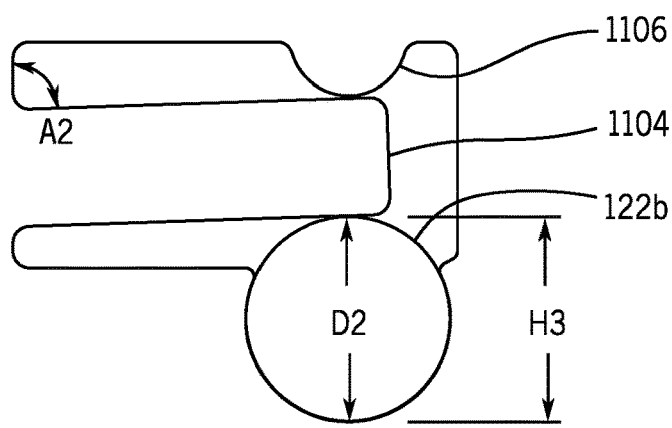

VEHICLE INTERIOR COMPONENT

CROSS-REFERENCE TO RELATED APPLICATIONS

The present application is a continuation of U.S. patent application Ser. No. 16/134,431 titled "VEHICLE INTERIOR COMPONENT" filed Sep. 18, 2018 (now U.S. Pat. No. 10,836,323), which is a continuation of International/PCT Patent Application No. PCT/US2018/036468 titled "VEHICLE INTERIOR COMPONENT" filed Jun. 7, 2018, which claims the benefit of U.S. Provisional Patent Application No. 62/517,491 titled "CONSOLE FOR VEHICLE INTERIOR" filed Jun. 9, 2017.

The present application claims priority to and incorporates by reference in full the following patent applications: (a) U.S. Provisional Patent Application No. 62/517,491 titled "CONSOLE FOR VEHICLE INTERIOR" filed Jun. 9, 2017; (b) International/PCT Patent Application No. PCT/US2018/036468 titled "VEHICLE INTERIOR COMPONENT" filed Jun. 7, 2018; (c) U.S. patent application Ser. No. 16/134,431 titled "VEHICLE INTERIOR COMPONENT" filed Sep. 18, 2018 (now U.S. Pat. No. 10,836,323).

FIELD

The present invention relates to a vehicle interior component.

BACKGROUND

It is known to provide a component for a vehicle interior including a base and a bin installed in the base and configured for rotation relative to the base between an open position and a closed position for storing small personal articles and other items. For example, an overhead console in a vehicle may include a retractable storage compartment suitable for storing sunglasses.

It would be advantageous to provide an improved vehicle interior component. It would also be advantageous to provide an improved vehicle interior component with an improved coupling for the bin to the base.

SUMMARY

The present invention relates to a component for a vehicle interior comprising a base; a shaft; a seat for the shaft; and a bin configured to be installed in the base and for rotation relative to the base between a closed position and an open position. The bin may be configured to be installed in the base by coupling of the shaft to the seat. The seat may comprise an aperture for the shaft and a tab configured to retain the shaft in the aperture for rotation of the bin relative to the base by rotation of the shaft relative to the aperture. The tab may be configured to contact the shaft along a plane adjacent to the shaft. The tab may be configured to retain the shaft at a tangent of the shaft. The tab may be configured to apply a force on the shaft. The component may comprise a protrusion; the tab may be configured to contact the protrusion in response to engagement of the shaft and the tab. The tab may comprise a set of opposing sides and an end; one side of the set of sides of the tab may be configured to contact the shaft. The component may comprise a protrusion; the other side of the set of sides of the tab may be configured to contact the protrusion. The tab may extend as a cantilever in an extended direction; the tab may be configured to apply a force on the shaft transverse to the extended direction. The tab may extend from the base in a direction generally parallel to an axis of rotation of bin; the tab may comprise a surface configured to contact the shaft; the surface of the tab may be generally parallel to an axis of rotation of bin. The tab may comprise at least one of (a) a flexible projection; (b) a flange; (c) a flexible tab; (d) a guide. The seat may comprise a slot; the tab may comprise a flexible guide transverse to the slot and may be configured to nest the shaft in the aperture. The bin may comprise a sunglass holder; the component may comprise an overhead console.

The present invention relates to a component for a vehicle interior comprising a base; a shaft; a seat for the shaft; and a bin configured to be installed in the base and for rotation relative to the base between a closed position and an open position. The bin may be configured to be installed in the base by coupling of the shaft to the seat. The seat may comprise an aperture for the shaft and a tab configured to retain the shaft in the aperture for rotation of the bin relative to the base by rotation of the shaft relative to the aperture. The tab may extend from the base in an extended direction; the tab may be configured to contact the shaft along a plane aligned with the extended direction. The tab may be configured to rotate in response to engagement with the shaft. The tab may comprise a guide configured to contact the shaft; the guide may be configured to at least one of (a) bend to accommodate variation in size of the shaft; (b) flex to accommodate variation in size of the shaft; (c) rotate to accommodate variation in size of the shaft. The tab may comprise a projection with a side and an end; the side of tab may be configured to retain the shaft in the aperture.

The present invention relates to a component for a vehicle interior comprising a base; a shaft; a seat for the shaft; and a bin configured to be installed in the base and for rotation relative to the base between a closed position and an open position. The bin may be configured to be installed in the base by coupling of the shaft to the seat. The seat may comprise an aperture for the shaft and a tab configured to retain the shaft in the aperture for rotation of the bin relative to the base by rotation of the shaft relative to the aperture. The tab may extend from the base in an extended direction. The tab may be configured to apply a force to the shaft in a direction transverse to the extended direction. The tab may extend at least partially across the seat. The tab may be configured to contact the shaft along a plane adjacent to the shaft. The tab may comprise a side and an end; the side of the tab may be configured to retain the shaft. The tab may be configured to apply a force on the shaft at a tangent of the shaft to retain the shaft for rotation in the aperture. The shaft may comprise a pin having an effective diameter and the seat may comprise an effective diameter provided by the aperture configured fit to the effective diameter of the pin for the shaft to retain the shaft in the seat.

The present invention relates to a component for a vehicle interior comprising a base; a shaft; a seat for the shaft; and a bin configured to be installed in the base and for rotation relative to the base between a closed position and an open position. The bin may be configured to be installed in the base by coupling of the shaft to the seat. The seat may comprise an aperture for the shaft and a tab configured to retain the shaft in the aperture for rotation of the bin relative to the base by rotation of the shaft relative to the aperture. The tab may comprise at least one of a flexible projection; a flange; a flexible tab; a guide. The tab may comprise a flexible projection configured to retain the shaft into the aperture of the seat. The seat may comprise a slot; the tab may comprise a flexible guide adjacent to the slot and configured to nest the shaft in the aperture. The shaft may comprise a pin having an effective diameter and the seat may comprise an effective diameter provided by the aperture and the guide configured fit to the effective diameter of the pin for the shaft to retain the shaft in the seat. The bin may comprise a sunglass holder; the component may comprise an overhead console.

The present invention relates to a component for a vehicle interior comprising a base; a pivot; and a bin coupled to the base at the pivot for movement between a first state with the bin in a closed position; a second state with the bin in an open position. At least one of the base or the bin may comprise a feature configured to guide movement of the bin at the pivot between the first state and the second state. The feature may comprise a guide configured to contact the pivot. The guide may be configured to at least one of bend to accommodate variation in size of the pivot; flex to accommodate variation in size of the pivot; rotate to accommodate variation in size of the pivot. The guide may be configured (a) to contact a first pivot comprising a minimum size; and (b) at least one of (1) to bend in response to contact with a second pivot of a maximum size; (2) to flex in response to contact with a second pivot of a maximum size; (3) to rotate in response to contact with a second pivot of a maximum size. The feature may comprise a tab; the tab may be configured to at least one of bend in response to engagement with the pivot; flex in response to engagement with the pivot; rotate in response to engagement with the pivot. The feature may comprise a tab and a protrusion; the tab may be configured to contact the protrusion in response to engagement of the pivot and the tab. The feature may comprise a guide and an aperture; the aperture may define a support and the pivot may be configured to be held between the guide and the support as the bin moves relative to the base.

The present invention relates to a component for a vehicle interior comprising a base; a pivot; and a bin coupled to the base at the pivot for movement between a first state with the bin in a closed position; a second state with the bin in an open position. At least one of the base or the bin may comprise the pivot; an other of the base or the bin may comprise an aperture configured to receive the pivot. The aperture may comprise a feature configured to prevent translation of the pivot and allow rotation of the bin. The aperture may comprise a curved portion and the feature. The aperture may contact the pivot at a first contact and the feature may contact the pivot at a second contact. The first contact may be at the curved portion and the second contact may be at the feature. The curved portion may receive and support the pivot at the first contact; the feature may apply a force on the pivot at the second contact. The feature may comprise a tab. The feature may be configured to permit translation of the pivot in an axial direction.

The present invention relates to a component for a vehicle interior comprising a base, a shaft, a seat for the shaft and a bin configured to be installed in the base and for rotation relative to the base between a closed position and an open position. The bin may be configured to be installed in the base by coupling of the shaft to the seat. The seat may comprise an aperture for the shaft and a tab configured to retain the shaft in the aperture for rotation of the bin relative to the base by rotation of the shaft relative to the aperture. The base may comprise the seat and the bin may comprise the shaft. The shaft may be on the bin. The seat may be on the base. The bin may comprise the seat and the base may comprise the shaft. The tab may comprise at least one of (a) a flexible projection; (b) a flange; (c) a flexible tab; (d) a guide. The shaft may comprise at least one of (a) a pivot; (b) a pin; (c) a post; (d) an axle; (e) a post; (f) a projection; (g) a cylindrical projection; (h) a set of shafts. The seat may comprise at least one of (a) a nest; (b) a slot; (c) a set of slots. The aperture may comprise at least one of (a) a hole configured for the shaft; (b) a bearing configured for the shaft; (c) a set of apertures. The shaft may be integrally formed on the bin. The aperture may be integrally formed on the base. The tab may comprise a flexible projection configured to retain the shaft into the aperture of the seat. The seat may comprise a slot; the tab may comprise a flexible guide adjacent to the slot and configured to nest the shaft in the aperture. The shaft may comprise a pin having an effective diameter and the seat may comprise an effective diameter provided by the aperture. The guide may be configured to fit to the effective diameter of the pin for the shaft to retain the shaft in the seat.

The present invention also relates to a component for a vehicle interior comprising a base, a pivot mechanism and a bin configured to be installed in the base at the pivot mechanism and for rotation relative to the base between a closed position and an open position. The pivot mechanism may comprise a seat and a shaft configured for installation in the seat. The seat may comprise a bearing and a guide. The bearing may comprise an aperture. The guide may comprise a flexible projection configured to retain the shaft in the seat. The shaft may be configured to be installed into the bearing and to be retained by the guide to rotate relative to the bearing when the bin rotates relative to the base. The pivot mechanism may comprise a set of seats and a set of shafts. The pivot mechanism may comprise (a) a set of seats formed on the base comprising a set of guides and a set of bearings and (b) a set of shafts formed on the bin; the pivot mechanism may be configured so that when the bin is installed in the base each shaft of the set of shafts is installed into the bearing and retained by the guide of each corresponding seat of the set of seats.

The present invention also relates to a component for a vehicle interior comprising a base, a pivot and a bin coupled to the base at the pivot for movement between (1) a first state with the bin in a closed position; (2) a second state with the bin in an open position. At least one of the base or the bin may comprise a feature configured to guide movement of the bin at the pivot between the first state and the second state. The feature may comprise a guide configured to contact the pivot. The guide may be configured to accommodate variation in size of the pivot. The guide may be configured to at least one of bend, flex, rotate to accommodate variation in size of the pivot. The guide may be configured to (a) contact a first pivot comprising a minimum size and (b) at least one of bend, flex, rotate in response to contact with a second pivot of a maximum size. The guide may be integrally formed as part of the base or the bin. The feature may comprise a tab. The tab may be configured to engage the pivot. The tab may be configured to at least one of (a) bend, (b) flex, (c) rotate in response to engagement with the pivot. The tab may be formed within at least one of the base or bin. The feature may comprise a protrusion. The tab may be configured to contact the protrusion in response to engagement of the pivot and the tab. The feature may comprise a cantilever beam. The cantilever beam may be integrally formed as part of the base or the bin. The feature may comprise a guide and an aperture. The aperture may comprise a portion defining a support for the pivot and a portion defining the guide. The pivot may be configured to rotate within the aperture. The aperture may be configured to rotate about the pivot. The aperture may define a support configured to support the pivot and the guide may be configured to provide a force to the pivot against the support. The aperture may defines a support and the guide may be configured to bias the pivot against the support. The aperture may define a support and the pivot may be configured to be held between the guide and the support as the bin moves relative to the base. The guide may be integrally formed as part of the base or the bin. The guide may extend into the aperture. The feature may be integrally formed as part of the base or the bin. The feature may comprise a support for the pivot and a guide. The feature may contact the pivot at a first contact and a second contact. The first contact may be at the support; the second contact may be at the guide. The support may receive and may support the pivot at the first contact. The guide may apply a force on the pivot at the second contact. The bin may comprise a sunglass holder; the component may comprise an overhead console.

The present invention also relates to a component for a vehicle interior comprising a base, a pivot and a bin coupled to the base at the pivot for movement between (1) a first state with the bin in a closed position; (2) a second state with the bin in an open position. At least one of the base or the bin may comprise a feature configured to prevent translation of the pivot in a direction generally orthogonal to an axis of rotation of the bin and allow rotation of the bin. The feature may comprise a support for the pivot and a guide. The feature may contact the pivot at a first contact and a second contact. The first contact may be at the support; the second contact may be at the guide. The support may receive and may support the pivot at the first contact. The guide may apply a force on the pivot at the second contact. The feature may prevent translational movement in only two dimensions.

The present invention further relates to a component for a vehicle interior comprising a base, a pivot and a bin coupled to the base at the pivot for movement between (1) a first state with the bin in a closed position; (2) a second state with the bin in an open position. At least one of the base or the bin may comprise the pivot. An other of the base or the bin may comprise an aperture configured to receive the pivot. The aperture may comprise a feature configured to prevent translation of the pivot and allow rotation of the bin. The aperture may comprise a curved portion and the feature. The aperture may contact the pivot at a first contact and the feature may contact the pivot at a second contact. The first contact may be at the curved portion; the second contact may be at the feature. The curved portion may receive and may support the pivot at the first contact. The feature may apply a force on the pivot at the second contact. The feature may comprise a tab. The feature may prevent translation in only two dimensions.

FIGURES

FIG. 2A is a schematic perspective view of a vehicle interior component according to an exemplary embodiment.

FIG. 2B is a schematic partial perspective view of a vehicle interior component according to an exemplary embodiment.

FIGS. 6A through 6D are schematic partial cross-section views of a vehicle interior component according to an exemplary embodiment.

DESCRIPTION

Figure 1A:
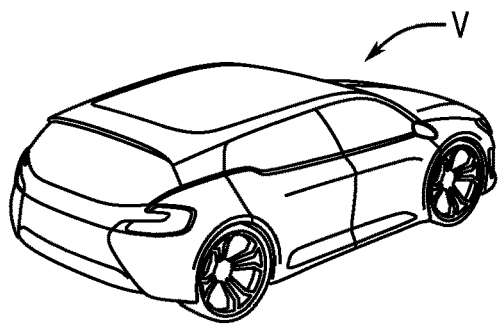
FIG. 1A is a schematic perspective view of a vehicle according to an exemplary embodiment.
Figure 1B:
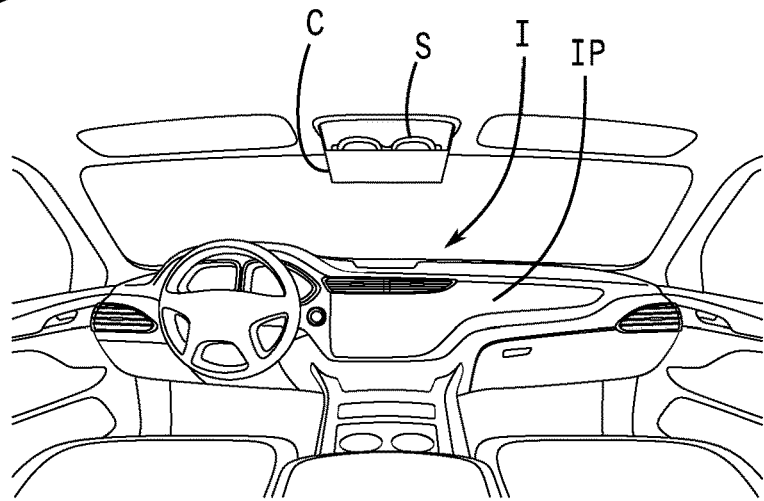
FIG. 1B is a schematic perspective front view of a vehicle interior according to an exemplary embodiment.

According to an exemplary embodiment shown schematically in FIGS. 1A and 1B, a vehicle V may comprise an interior I providing an instrument panel IP and a vehicle interior component shown as a console C configured to receive and stow articles such as sunglasses S.

Figure 1C:
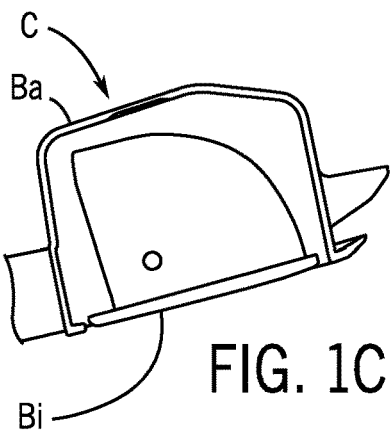
FIGS. 1C through 1E are schematic cross-section views of a vehicle interior component according to an exemplary embodiment.
Figure 1D:
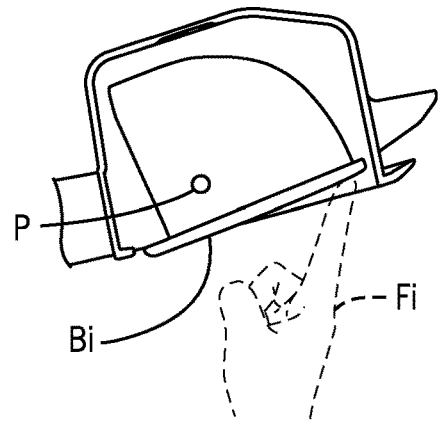
Figure 1E:
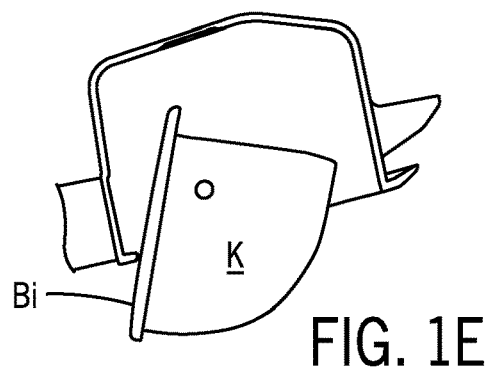

According to an exemplary embodiment shown schematically in FIGS. 1C through 1E, the vehicle interior component C may comprise a base Ba and a bin Bi configured to be installed in base Ba and for rotation relative to base Ba between a closed position as shown schematically in FIG. 1C and an open position as shown schematically in FIG. 1E. An external force, for example from a finger Fi, may be applied to bin Bi to unlatch bin Bi from base Ba for rotation of bin Bi relative to base Ba about a shaft/pivot P as shown schematically in FIG. 1D. Bin Bi may comprise a storage compartment or volume K to receive and stow items. See FIG. 1C.

Figure 4A:
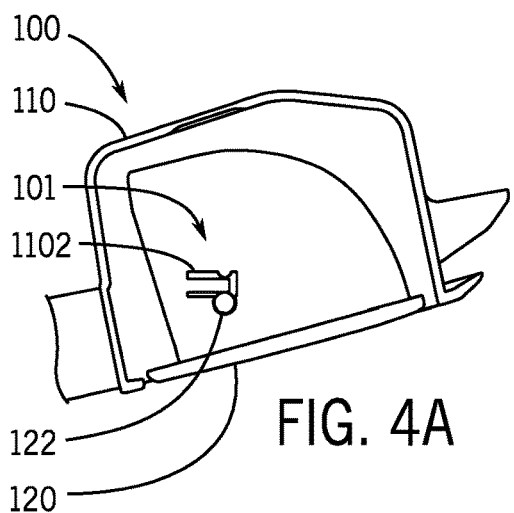
FIGS. 4A through 4E are schematic cross-section views of a vehicle interior component according to an exemplary embodiment.
Figure 4B:
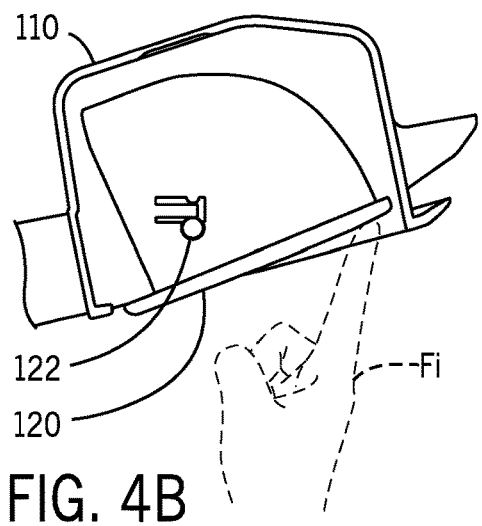
Figure 4C:
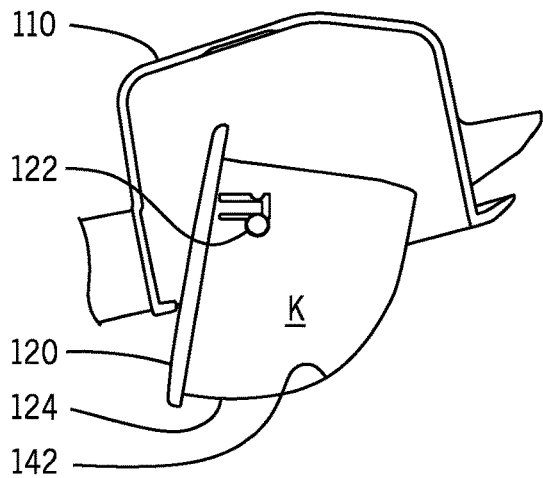

According to an exemplary embodiment as shown schematically in FIGS. 2A and 2B, a vehicle interior component shown as console 100 may comprise a base 110, a shaft/pivot 122, a seat 101 for shaft/pivot 122 and a bin 120 configured to be installed in base 100 and for rotation relative to base 110 between a closed position (see FIGS. 4A and 4E) and an open position (see FIG. 4C). Bin 120 may be configured to be installed in base 110 by coupling of shaft/pivot 122 to seat 101.

Figure 3A:
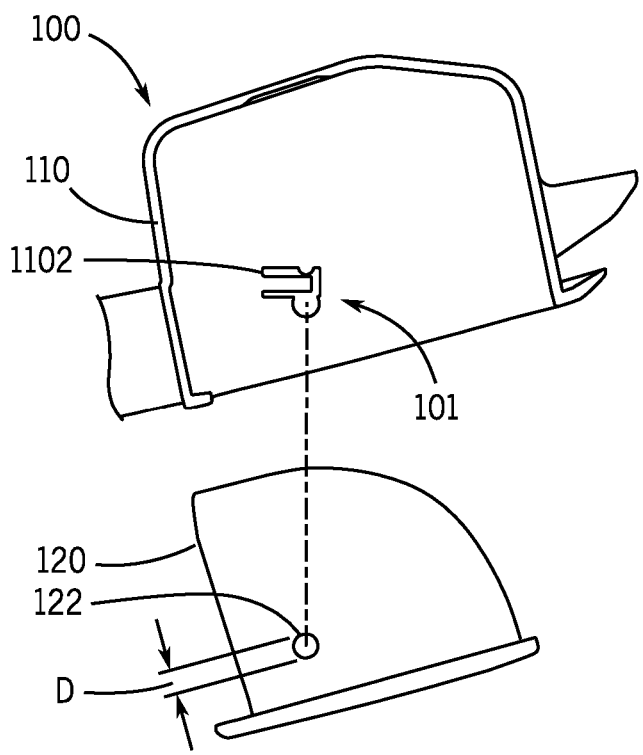
FIG. 3A is a schematic exploded cross-section view of a vehicle interior component according to an exemplary embodiment.

According to an exemplary embodiment shown schematically in FIG. 3A, base 110 may comprise seat 101; bin 120 may comprise shaft/pivot 122. Shaft/pivot 122 may be on bin 120. Seat 101 may be on base 110. Shaft/pivot 122 may be integrally formed on bin 120. Shaft/pivot 122 may be configured to rotate within aperture 1102.

Figure 3B:
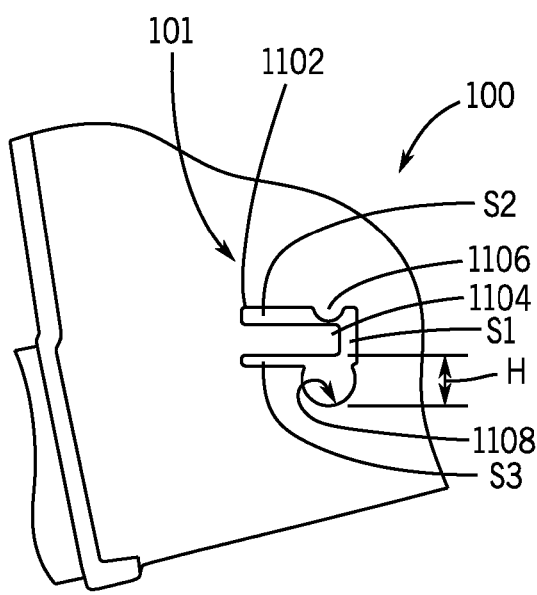
FIG. 3B is a schematic partial cross-section view of a vehicle interior component according to an exemplary embodiment.
Figure 3C:
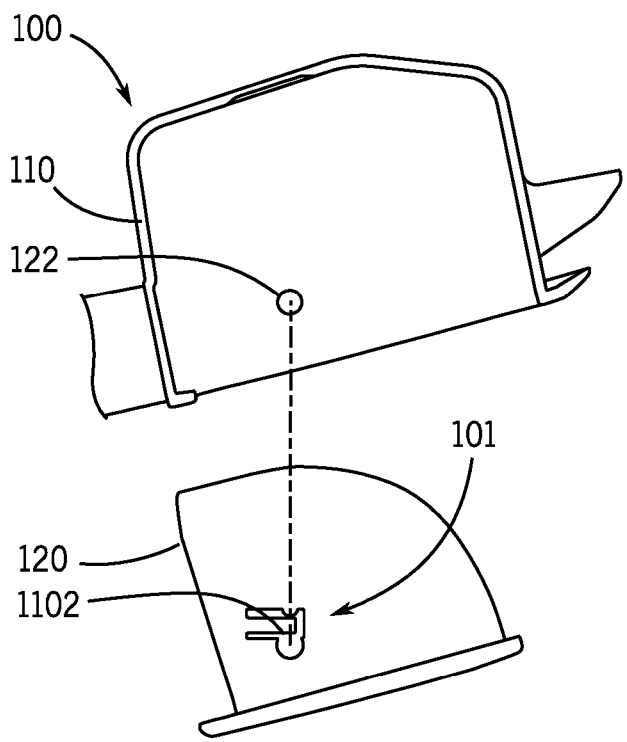
FIG. 3C is a schematic exploded cross-section view of a vehicle interior component according to an exemplary embodiment.

According to an exemplary embodiment shown schematically in FIG. 3C, base 110 may comprise shaft/pivot 122; bin 120 may comprise seat 101. Aperture 1102 may be configured to rotate about shaft/pivot 122.

According to an exemplary embodiment shown schematically in FIG. 3B, seat 101 may comprise an aperture 1102 for shaft/pivot 122 and a tab/guide 1104 configured to retain shaft/pivot 122 in aperture 1102 for rotation of bin 120 relative to base 110 by rotation of shaft/pivot 122 relative to aperture 1102. Tab/guide 1104 may comprise at least one of (a) a flexible projection, (b) a flange, (c) a flexible tab, (d) a guide, etc. See e.g. FIGS. 3A-3D, 4A-4F, 5A-5B, 5D, 6A-6B and 6D. Shaft/pivot 122 may comprise at least one of (a) a pivot, (b) a pin, (c) a post, (d) an axle, (e) a post, (f) a projection, (g) a cylindrical projection, (h) a set of shafts. See e.g. FIGS. 3A-3D, 4A-4F, 5C-5D, and 6C-6D. Seat 101 may comprise at least one of (a) a nest, (b) a slot, (c) a set of slots. See e.g. FIGS. 3A-3D, 4A-4F, 5A-5D and 6A-6D. Aperture 1102 may comprise at least one of (a) a hole configured for shaft/pivot 122, (b) a bearing configured for shaft/pivot 122, (c) a set of apertures. Aperture 1102 may be integrally formed on the base. Tab/guide 1104 may comprise a flexible projection configured to retain shaft/pivot 122 into aperture 1102 of seat 101. Seat 101 may comprise a slot S1/S2/S3; tab/guide 1104 may comprise a flexible guide adjacent to slot S1/S2/S3 and configured to nest shaft/pivot 122 in aperture 1102. Shaft/pivot 122 may comprise a pin having an effective diameter and seat 101 may comprise an effective diameter provided by aperture 1102. Tab/guide 1104 may be configured to fit to the effective diameter of the pin for shaft/pivot 122 to retain shaft/pivot 122 in seat 101.

According to an exemplary embodiment as shown schematically in FIGS. 2A and 2B, vehicle interior component shown as console 100 may comprise base 110, a pivot mechanism and bin 120 configured to be installed in base 100 at the pivot mechanism and for rotation relative to base 110 between a closed position (see FIGS. 4A and 4E) and an open position (see FIG. 4C). As shown schematically, the pivot mechanism may comprise seat 101 and shaft/pivot 122 configured for installation in seat 101.

According to an exemplary embodiment shown schematically in FIG. 3B, seat 101 may comprise a bearing 1108 and a tab/guide 1104. Bearing 1108 may comprise an aperture. Tab/guide 1104 may comprise a flexible projection configured to retain shaft/pivot 122 in seat 101. Shaft/pivot 122 may be configured to be installed into bearing 1108 and to be retained by tab/guide 1104 to rotate relative to bearing 1108 when bin 120 rotates relative to base 110. According to an exemplary embodiment, the pivot mechanism may comprise a set of seats 101 and a set of shafts 122. According to an exemplary embodiment, the pivot mechanism may comprise (a) a set of seats 101 formed on base 110 comprising a set of guides 1104 and a set of bearings 1108 and (b) a set of shafts 122 formed on bin 120; the pivot mechanism may be configured so that when bin 120 is installed in base 110 each shaft/pivot 122 of the set of shafts 122 is installed into bearing 1108 and retained by the tab/guide 1104 of each corresponding seat 101 of the set of seats 101.

According to an exemplary embodiment as shown schematically in FIGS. 2A and 2B, vehicle interior component shown as console 100 may comprise base 110, shaft/pivot 122 and bin 120 coupled to base 110 at shaft/pivot 122 for movement between a first state with bin 120 in a closed position (see FIGS. 4A and 4E) and a second state with bin 120 in an open position (see FIG. 4C). According to an exemplary embodiment, at least one of base 110 or bin 120 may comprise a guide or retention/structure shown as a feature 101 configured to guide movement of bin 120 at pivot 122 between the first state and the second state.

Feature 101 may comprise tab/guide 1104 configured to contact pivot 122. Tab/guide 1104 may be configured to accommodate variation in size of pivot 122. Tab/guide 1104 may be configured to at least one of bend, flex, rotate to accommodate variation in size of pivot 122 as shown schematically in FIG. 6D. Tab/guide 1104 may be configured to (a) contact a first pivot 122a comprising a minimum size as shown schematically in FIG. 5D and (b) at least one of bend, flex, rotate in response to contact with a second pivot 122b of a maximum size as shown schematically in FIG. 6D. Guide 1004 may be integrally formed as part of base 110 or bin 120. Feature 101 may comprise tab/guide 1104. Tab/guide 1104 may be configured to engage pivot 122 as shown schematically in FIGS. 4F, 5D and 6D. Tab/guide 1104 may be configured to at least one of (a) bend, (b) flex, (c) rotate in response to engagement with pivot 122 as shown schematically in FIG. 6D. Tab/guide 1104 may be formed within at least one of base 110 (see FIGS. 3A and 3B) or bin 120 (see FIGS. 3C and 3D). Feature 101 may comprise a protrusion 1106. Tab/guide 1104 may be configured to contact protrusion 1106 in response to engagement of pivot 122 and tab/guide 1104 as shown schematically in FIG. 6D. Feature 101 may comprise a cantilever beam 1104; cantilever beam 1104 may be integrally formed as part of base 110 or bin 120. Feature 101 may comprise a tab/guide 1104 and an aperture 1102. As shown schematically in FIG. 4F, aperture 1102 may comprise a portion 1102a defining a support for pivot 122 and a portion 110s defining tab/guide 1104. Aperture 1102 may define a support 1102a configured to support pivot 122 and tab/guide 1104 may be configured to provide a force F to pivot 122 against support 1102a as shown schematically in FIG. 4F. Aperture 1102 may define a support 1102a and tab/guide 1104 may be configured to bias pivot 122 against support 1102a. Aperture 1102 may define a support 1102a and pivot 122 may be configured to be held between tab/guide 1104 and support 1102a as bin 120 moves relative to base 110. Tab/guide 1104 may be integrally formed as part of base 110 or bin 120. Tab/guide 1104 may extend into aperture 1102. Feature 101 may be integrally formed as part of base 110 or bin 120. Feature 101 may comprise support 1102a for pivot 122 and tab/guide 1104. Feature 101 may contact pivot 122 at a first contact P1 and a second contact P2 as shown schematically in FIG. 4F. First contact P1 may be at support 1102a; second contact P2 may be at tab/guide 1104. Support 1102a may be configured to support pivot 122 at first contact P1. Tab/guide 1104 may apply a force F on pivot 122 at second contact P2. Bin 120 may comprise a sunglass holder; component 100 may comprise an overhead console.

According to an exemplary embodiment, at least one of base 110 or bin 120 may comprise feature 101 configured to prevent translation of pivot 122 in a direction generally orthogonal to an axis of rotation of bin 120 and allow rotation of bin 120. Feature 101 may comprise support 1102a for pivot 122 and tab/guide 1104. Feature 101 may contact pivot 122 at first contact P1 and second contact P2. First contact P1 may be at support 1102a; second contact P2 may be at tab/guide 1104. Support 1102a may be configured to support pivot 122 at first contact P1. Tab/guide 1104 may apply a force F on pivot 122 at second contact P2. Feature 101 may prevent translational movement in only two dimensions.

According to an exemplary embodiment shown schematically in FIG. 3A, interior component 100 may comprise a base 110 and a bin 120. Bin 120 may rotate between an open position and a closed position relative to base 110. Bin 120 may rotate relative to base 110 about a pivot or pin 122. Base 110 may be coupled to pivot 122, or bin 120 may be coupled to pivot 122. According to an exemplary embodiment, at least one of base 110 and bin 120 may comprise shaft/pivot 122; shaft/pivot 122 may rotate within a feature or an aperture 1102 formed in either bin 120 or base 120 (e.g. the opposite component than the component that comprises shaft/pivot 122). Bin 120 may comprise pivot 122, and base 110 may comprise aperture 1102 or vice versa.

According to an exemplary embodiment, the pin/post shown as pivot 122 may comprise a diameter D; diameter D may vary in a range (e.g. within mass production/manufacturing tolerance limits between a largest diameter and a smallest diameter).

According to an exemplary embodiment shown schematically in FIG. 3B, aperture 1102 may be formed in base 110; aperture 1102 may receive pivot 122 and may enable rotation of pivot 122 within aperture 1102. Aperture 1102 may comprise a tab/guide 1104 and a protrusion 1106. Tab/guide 1104 may contact and engage pivot 122; aperture 1102 may receive pivot 122. Tab/guide 1104 may contact and engage pivot 122 when bin 120 is in an open position and a closed position. Tab/guide 1104 may bend or flex in response to engagement with pivot 122. Bending or flexing of tab/guide 1104 may depend on diameter D of pivot 122 and a height H of aperture 1102.

According to an exemplary embodiment, height H may vary in a range (e.g. within mass production/manufacturing tolerance limits between a largest height and a smallest height).

According to an exemplary embodiment shown in FIG. 3B, protrusion 1106 may contact and engage tab/guide 1104 when tab/guide 1104 flexes. Tab/guide 1104 may contact protrusion 1106 when diameter D of shaft/pivot 122 is the largest diameter. Protrusion 1106 may engage tab/guide 1104 to provide contact between tab/guide 1104 and shaft/pivot 122. Aperture 1102 may comprise a slot S1, a slot S2 and a slot S3.

According to an exemplary embodiment, aperture 1102, tab/guide 1104, and protrusion 1106 may guide movement of bin 120 relative to base 110 at pivot 122. According to an exemplary embodiment, aperture 1102, tab/guide 1104, and protrusion 1106 may be formed in either bin 120 or base 110. According to an exemplary embodiment, the pin may be formed in the bin or in the base; the aperture may be formed on the base (if the pin is provided on the bin) or bin. (if the pin is provided on the base) to provide the pivot mechanism (e.g. seat/bearing).

Figure 3D:
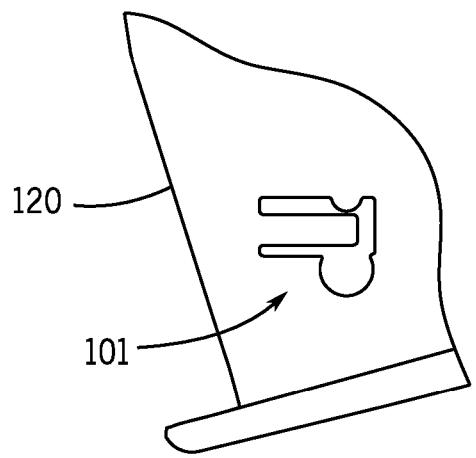
FIG. 3D is a schematic partial cross-section view of a vehicle interior component according to an exemplary embodiment.

According to an exemplary embodiment shown schematically in FIGS. 3C through 3D, aperture 1102 may be formed in bin 120. Pivot 122 may be coupled to base 110. Aperture 1102 may receive pivot 122 and may enable rotation of aperture 1102 at pivot 122.

According to an exemplary embodiment shown schematically in FIGS. 4A through 4E, interior component 100 may comprise bin 120; bin 120 may be configured to rotate at pivot 122. Bin 120 may comprise a panel or wall with an interior surface 142 and an outer surface 124; interior surface 142 of bin 120 may define an interior compartment, storage volume, bucket or receptacle of space K for storage of articles (such as sunglasses). Bin 120 may be coupled to base 110 at pivot 122, pivot 122 may be configured to facilitate rotation of bin 120 relative to base 110. As shown schematically in FIG. 4B, a finger Fi may push on bin 120 to an over-travel position to unlatch and open bin 120 and allow bin 120 to rotate to provide access to compartment K of bin 120. Bin 120 may latch to base 110 via a push latch. As shown schematically in FIG. 4C, bin 120 may be supported on base 110 by pivot 122 in an open position.

Figure 4D:
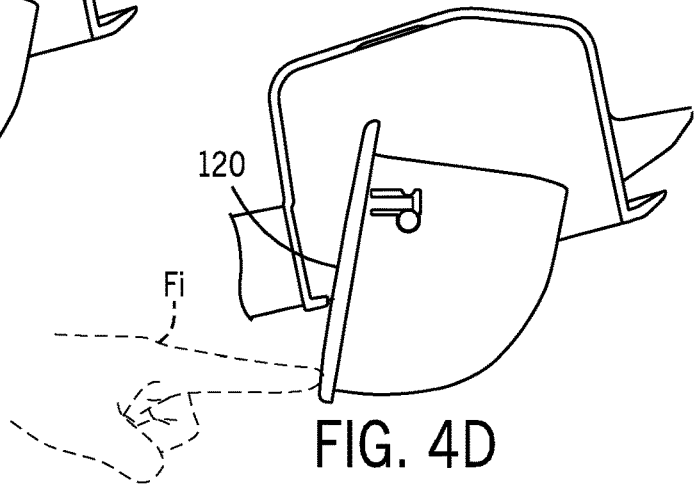
Figure 4E:
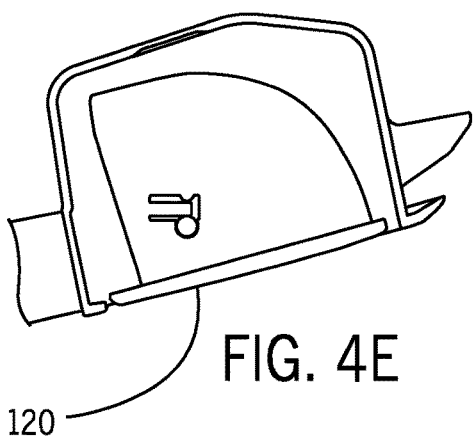
Figure 4F:
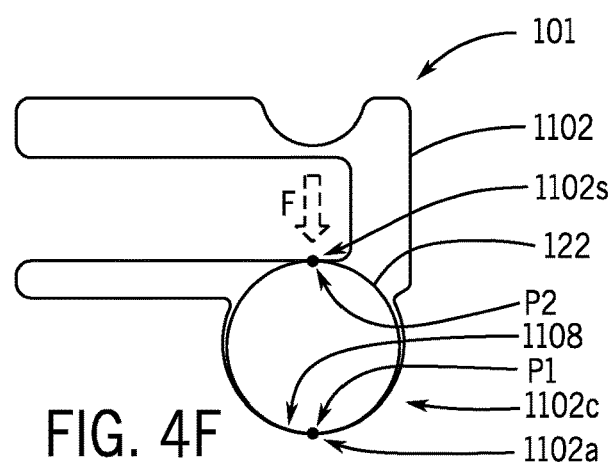
FIG. 4F is a schematic partial cross-section view of a vehicle interior component according to an exemplary embodiment.

According to an exemplary embodiment shown schematically in FIG. 4D, finger Fi may move bin 120 towards a closed position as shown schematically in FIG. 4E; finger Fi may provide an external force to overcome an opposing force, e.g. gravity or a spring (not shown). Items may be stored and/or concealed in interior component 100 (behind closed bin 120) in the closed position.

According to an exemplary embodiment shown schematically in FIGS. 5A through 5D, interior component 100 may comprise a pin/shaft shown as pivot 122a with a smallest diameter D1 (e.g. within a tolerance limit) and aperture 1102 may comprise a largest height H2 (e.g. within a tolerance limit). Aperture 1102 may comprise a curved portion that supports pivot 122a and a portion formed by tab/guide 1104; the curved portion may comprise a partial circle shape (or a substantially omega/U shape). Tab/guide 1104 may contact pivot 122a along a plane adjacent to pin 122a. Tab/guide 1104 may apply a force to pivot 122a; the force may substantially prevent translational movement of pivot 122a within aperture 1102 but may allow rotation of pin 122a within aperture 1102. Pivot 122a may contact aperture 1102 at a first contact point at the curved section of aperture 1102 and at a second contact point at tab/guide 1104. Height H2 of aperture 1102 may be measured from a bottom point of aperture 1102 to tab/guide 1104 (see FIGS. 5B and 5D). Tab/guide 1104 may be configured to bend or flex based on diameter D1 of pivot 122a. A small or negligible amount of flex in tab/guide 1104 may form a gap G1 between tab/guide 1104 and protrusion 1106 and an angle A1 between aperture 1102 and tab/guide 1104 of approximately 90 degrees. Aperture 1104 may receive pin 122a. As shown schematically according to an exemplary embodiment, the diameter of the curved section of aperture 1102 may be larger than diameter D1 of pin 122a; a gap (or gaps) may form at a top portion of the curved section around pin 122a. Diameter D1 and height H2 may be substantially equal; angle A1 may be approximately 90 degrees; tab/guide 1104 may bend a small or negligible amount.

According to an exemplary embodiment shown schematically in FIGS. 6A through 6D, interior component 100 may comprise a pin/shaft shown as pivot 122b of a largest diameter D2 (e.g. within a tolerance limit) and aperture 1102 may comprise a smallest height H1 (e.g. within a tolerance limit). Aperture 1102 may include a curved portion that supports pivot 122b and a portion formed by tab/guide 1104; the curved portion may comprise a partial circle shape (or a substantially omega/U shape). Tab/guide 1104 may contact pin 122b along a plane adjacent to pin 122b. Tab/guide 1104 may apply a force to pin 122b; the force may substantially prevent translational movement of pin 122b within aperture 1102 and may allow rotation of pin 122b within aperture 1102. Aperture 1102 may contact pin 122b at a first contact point at the curved section of aperture 1102 and a second contact point at tab/guide 1104. Height H1 of aperture 1102 may be measured from a bottom point of aperture 1102 to tab/guide 1104 (see FIG. 6B). Tab/guide 1104 may be configured to bend or flex based on diameter D2 of pivot 122b. Tab/guide 1104 may contact protrusion 1106 and may form an angle A2 between aperture 1102 and tab/guide 1104 of less than 90 degrees. Aperture 1104 may receive pin 122b. As shown schematically, the diameter of the curved section may be substantially equal to diameter D2 of pivot 122b. Diameter D2 may be substantially larger than height H2; tab/guide 1104 may bend due to force applied by pivot 122b resulting in a height H3 between tab/guide 1104 and the bottom point of the curved section of aperture 1102; height H3 may be substantially equal to diameter D2; angle A2 may be less than 90 degrees; tab/guide 1104 may bend to contact protrusion 1106.

Figure 5A:
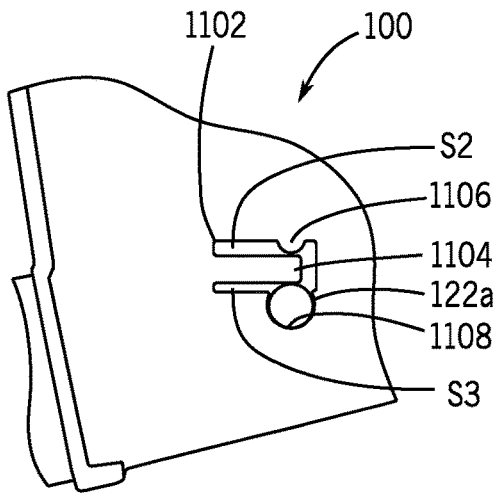
FIGS. 5A through 5D are schematic partial cross-section views of a vehicle interior component according to an exemplary embodiment.
Figure 5B:
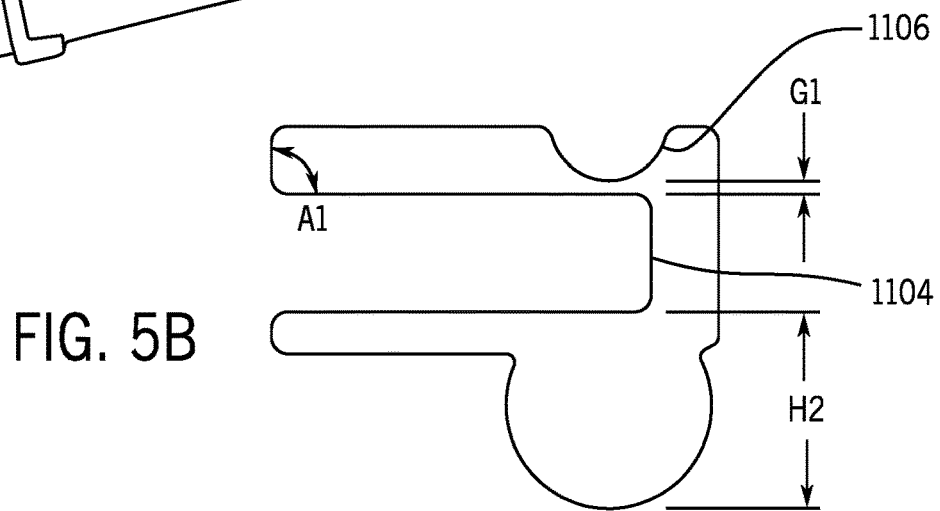
Figure 5C:
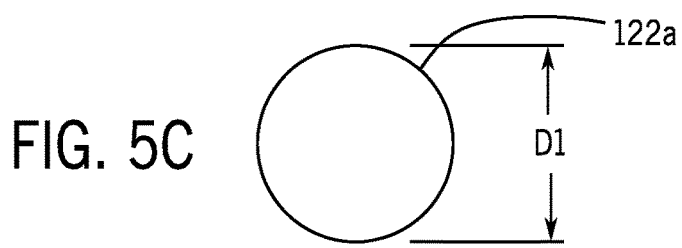
Figure 5D:
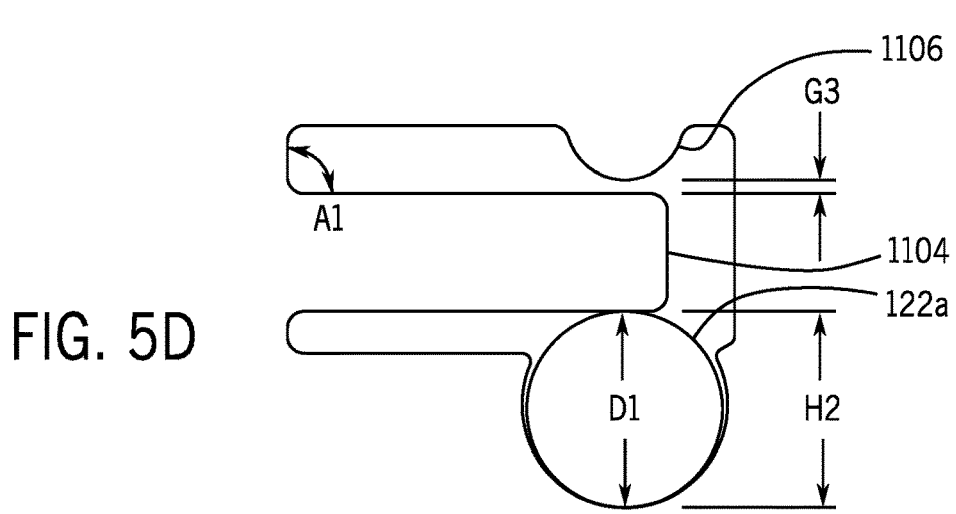

According to the exemplary embodiments as shown schematically in FIGS. 5D and 6D, tab/guide 1104 formed in aperture 1102 may accommodate pivot 122 comprising a diameter between D1 and D2. Aperture 1104 may comprise a height between H1 and H2 to accommodate pivot 122 comprising a diameter between D1 and D2.

Figure 7A:
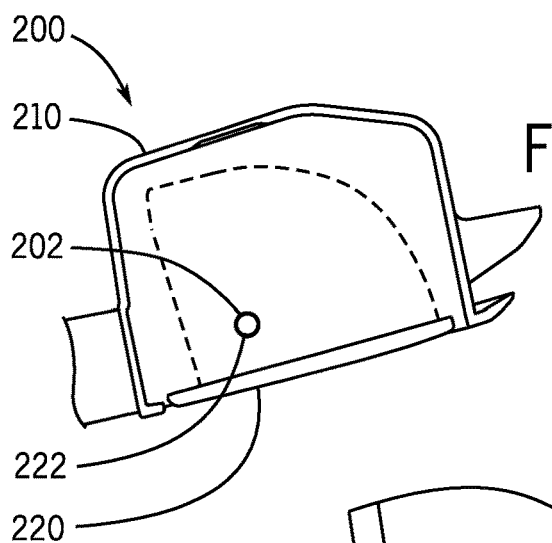
FIG. 7A is a schematic cross-section view of a conventional vehicle interior component according to an exemplary embodiment.
Figure 7B:
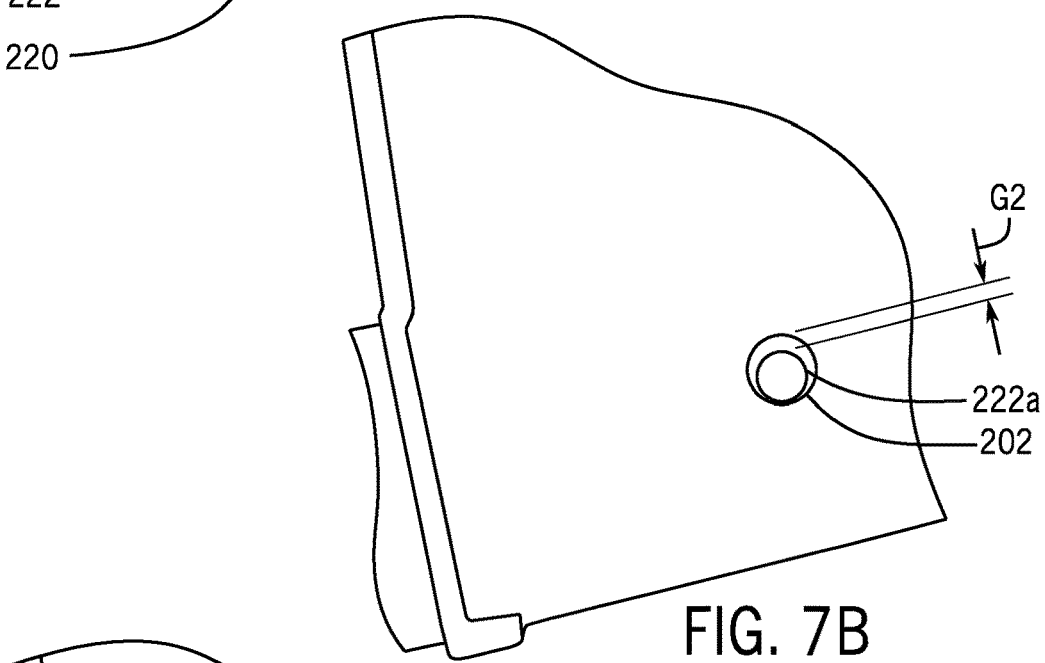
FIGS. 7B through 7C are schematic partial cross-section views of a conventional vehicle interior component according to an exemplary embodiment.
Figure 7C:
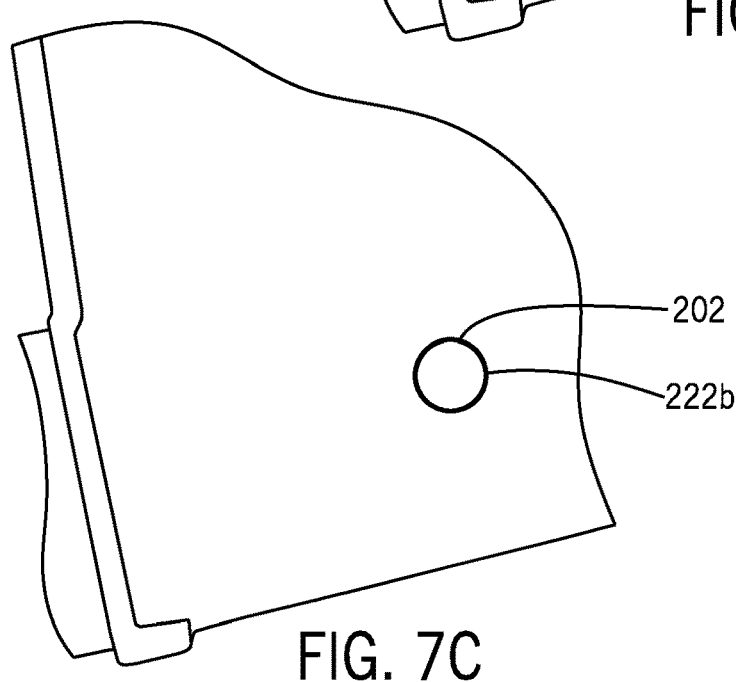

A conventional vehicle interior component 200 with a base 210 and a bin 220 is shown schematically and representationally in FIGS. 7A-7C; bin 220 in installed in base 210 with a pivot pin 222 in an opening 202 (intended to facilitate rotating movement of bin relative to base between open position and closed position); as indicated schematically in FIGS. 7B-7C, the size of the diameter of the pin in relation to the size of the diameter of the opening may in production (e.g. within manufacturing tolerances) result in a gap G2 between the pin and the interior of the opening (which may allow a degree of freedom of movement of the bin relative to the base that may produce looseness, rattling/noise, etc. in use) (see FIG. 7B) or result in a restrictive/friction fit of the pin in the opening (which may restrict/interfere with the degree of freedom of rotating movement of the bin relative to the base that may impede convenient use) (see FIG. 7C).

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

The invention claimed is:

1. A component for a vehicle interior comprising:
   (a) a base;
   (b) a shaft;
   (c) a seat for the shaft; and
   (d) a bin configured to be installed in the base and for rotation relative to the base between a closed position and an open position;
   wherein the bin is configured to be installed in the base by coupling of the shaft to the seat;
   wherein the seat comprises an aperture for the shaft and a tab configured to retain the shaft in the aperture for rotation of the bin relative to the base by rotation of the shaft relative to the aperture;
   wherein the tab is configured to contact the shaft along a plane adjacent to the shaft;
   wherein the tab is configured to retain the shaft at a tangent of the shaft.

2. The component of claim 1 wherein the tab is configured to apply a force on the shaft.

3. The component of claim 1 further comprising a protrusion; wherein the tab is configured to contact the protrusion in response to engagement of the shaft and the tab.

4. The component of claim 1 wherein the tab comprises a set of opposing sides and an end; and wherein one side of the set of sides of the tab is configured to contact the shaft.

5. The component of claim 4 further comprising a protrusion; wherein the other side of the set of sides of the tab is configured to contact the protrusion.

6. The component of claim 1 wherein the tab extends as a cantilever in an extended direction; wherein the tab is configured to apply a force on the shaft transverse to the extended direction.

7. The component of claim 1 wherein the tab extends from the base in a direction generally parallel to an axis of rotation of bin; wherein the tab comprises a surface configured to contact the shaft; wherein the surface of the tab is generally parallel to an axis of rotation of bin.

8. The component of claim 1 wherein the tab comprises at least one of (a) a flexible projection; (b) a flange; (c) a flexible tab; (d) a guide.

9. The component of claim 1 wherein the seat comprises a slot; and wherein the tab comprises a flexible guide transverse to the slot and configured to nest the shaft in the aperture.

10. The component of claim 1 wherein the bin comprises a sunglass holder; and wherein the component comprises an overhead console.

11. A component for a vehicle interior comprising:
    (a) a base;

(b) a shaft;
(c) a seat for the shaft; and
(d) a bin configured to be installed in the base and for rotation relative to the base between a closed position and an open position;
wherein the bin is configured to be installed in the base by coupling of the shaft to the seat;
wherein the seat comprises an aperture for the shaft and a tab configured to retain the shaft in the aperture for rotation of the bin relative to the base by rotation of the shaft relative to the aperture;
wherein the tab extends from the base in an extended direction;
wherein the tab is configured to contact the shaft along a plane aligned with the extended direction.

12. The component of claim 11 wherein the tab is configured to rotate in response to engagement with the shaft.

13. The component of claim 11 wherein the tab comprises a guide configured to contact the shaft; wherein the guide is configured to at least one of (a) bend to accommodate variation in size of the shaft; (b) flex to accommodate variation in size of the shaft; (c) rotate to accommodate variation in size of the shaft.

14. The component of claim 11 wherein the tab comprises a projection with a side and an end; wherein the side of tab is configured to retain the shaft in the aperture.

15. A component for a vehicle interior comprising:
(a) a base;
(b) a shaft;
(c) a seat for the shaft; and
(d) a bin configured to be installed in the base and for rotation relative to the base between a closed position and an open position;
wherein the bin is configured to be installed in the base by coupling of the shaft to the seat;
wherein the seat comprises an aperture for the shaft and a tab configured to retain the shaft in the aperture for rotation of the bin relative to the base by rotation of the shaft relative to the aperture;
wherein the tab extends from the base in an extended direction;
wherein the tab is configured to apply a force to the shaft in a direction transverse to the extended direction.

16. The component of claim 15 wherein the tab extends at least partially across the seat.

17. The component of claim 15 wherein the tab is configured to contact the shaft along a plane adjacent to the shaft.

18. The component of claim 15 wherein the tab comprises a side and an end; wherein the side of the tab is configured to retain the shaft.

19. The component of claim 15 wherein the tab is configured to apply a force on the shaft at a tangent of the shaft to retain the shaft for rotation in the aperture.

20. The component of claim 15 wherein the shaft comprises a pin having an effective diameter and the seat comprises an effective diameter provided by the aperture configured fit to the effective diameter of the pin for the shaft to retain the shaft in the seat.

* * * * *